United States Patent Office 2,934,353
Patented Apr. 26, 1960

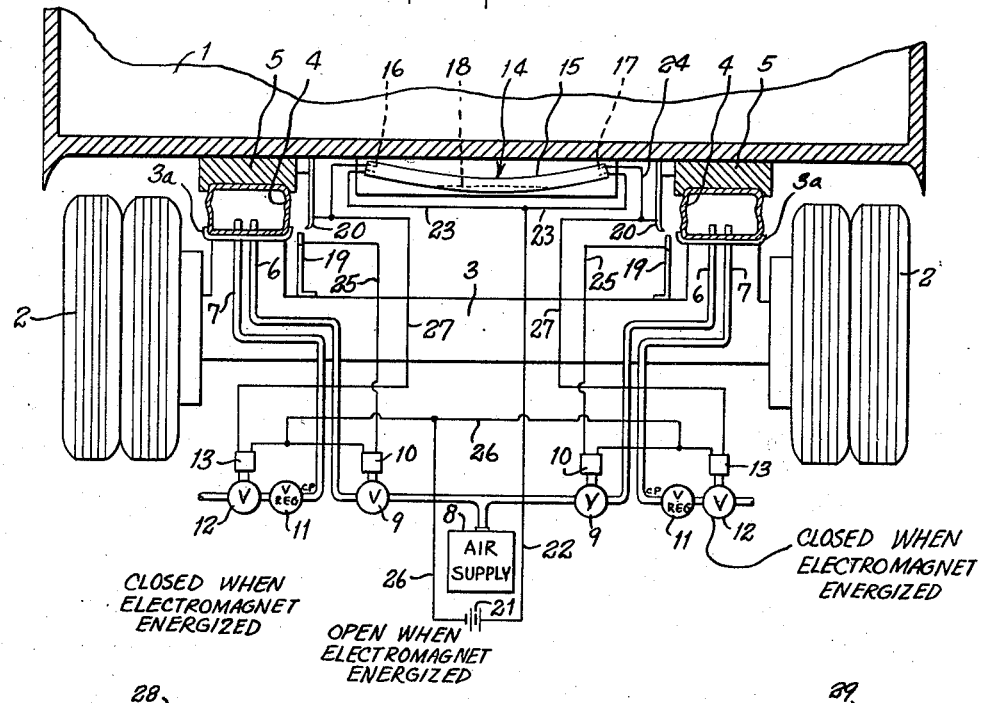

2,934,353

SWAY CONTROL APPARATUS FOR VEHICLES

Leslie B. d'Avigdor, New York, N.Y.

Application June 10, 1955, Serial No. 514,584

9 Claims. (Cl. 280—112)

This invention relates to sway control apparatus for vehicles. It is particularly concerned with improved apparatus for maintaining the body of a vehicle level against any tendency to tilt or lean to one side or the other. Such tilting or leaning may arise from any of several different causes, including, for example, uneven loading of the vehicle, travelling on a road with a high crown or other tilted surface, or travelling around a curve at high speed. Such swaying or tilting of the body of the vehicle is to be distinguished from transient upward and downward motions due to roughness of the road. Rapid upward and downward movement such as those due to roughness are best taken care of by the conventional spring and shock absorbing systems. The present invention is concerned with tilting and swaying movements of longer duration, rather than with the short duration movement due to rough roads, and is intended mainly to supplement existing suspensions, whether of the steel spring or air spring variety.

An object of the present invention is to provide improved sway control apparatus for motor vehicles.

A further object is to provide apparatus of the type described which distinguishes between motion of the vehicle body due to roughness of the road and swaying movements of longer duration.

Another object is to provide improved motor apparatus for correcting the level of a vehicle body.

Another object is to provide improved control apparatus for a body level controlling motor of the type described.

The foregoing objects are attained, in the apparatus described herein, by providing at each side of the motor vehicle, between the axle and the body, a body raising and lowering motor device including an expansible pneumatic chamber and means for supplying air to and discharging it from the chamber to regulate the volume of the chamber. This air supply and exhaust means is controlled by means of electrically operated valves in response to an electrically operated switch mechanism. The switch mechanism responds to centrifugal force and to gravity, and is thus affected by both tilting and lateral acceleration of the vehicle.

A preferred form of switch mechanism includes a tube in the shape of a wide shallow U, a pool of mercury within the tube and two sets of contacts at the opposite ends of the tube to be engaged by the mercury. The tube is mounted crosswise of the vehicle.

Other objects and advantages of the invention will become apparent from a consideration of the following description and claims, taken together with the accompanying drawing.

In the drawing:

Fig. 1 is a cross-sectional view, somewhat diagrammatic, showing a vehicle provided with a preferred form of sway control apparatus constructed in accordance with the invention; and Fig. 2 is a view similar to Fig. 1, showing a modified form of apparatus, and showing the body slightly tilted.

FIG. 1

There is shown in this figure a vehicle having a body 1 and two sets of dual wheels 2, the sets of wheels being mounted at opposite ends of an axle 3. On the top of the axle housing, at either side of the vehicle, there is provided a mounting pad 3a on which is supported an expansible pneumatic chamber or bellows generally indicated at 4.

The particular form of the chamber 4 which is employed is not material to the present invention. Many types of expansible pneumatic chambers are commercially available which will answer the purpose. The chamber must be able to expand or contract in a vertical direction in response to pressure inside it. The chamber is illustrated as a bellows having a convoluted side wall. Such a structure is presently preferred, but other equivalent structures may be used.

Frame members 5 supporting the body 1 rest on the top of the chambers 4. It should be understood that the body 1 and the frame 5 may be supported by the conventional springs and shock absorber arrangements, in addition to the sway control apparatus illustrated herein. The interior of each of the chambers 4 is in communication with an inlet conduit 6 and an outlet conduit 7. Inlet conduit 6 leads to a supply of air under pressure schematically indicated at 8. The flow of compressed air through the inlet pipe 6 is controlled by the valve 9 operated by an electromagnetic solenoid 10. The valve 9 is normally closed and is opened when the electromagnet is energized.

The outlet conduit 7 is connected through a pressure regulating valve 11 and a shut-off valve 12 to an outlet open to the atmosphere. The shut-off valve 12 is normally open, and is closed by energization of an associated electromagnet 13.

The electromagnets 10 and 13 are controlled by a gravity and/or centrifugal force operated switch generally indicated at 14 and comprising an elongated tube 15 of glass or other electrical insulating material. The tube 15 is of a broad U-shaped configuration and is mounted so that its long dimension extends transversely to the vehicle. Two pairs of electrodes 16 and 17 extend into the opposite ends of the tube 15. The tube contains a pool of mercury 18 or other electrically conducting fluid.

A correction limiting control is provide on each side of the vehicle, comprising a switch finger 19 insulatingly mounted on the housing of axle 3, and a cooperating switch finger 20 insulatingly mounted on the body 1. When the body of the vehicle and the axle are both level, the fingers 19 are both slightly spaced from their cooperating fingers 20.

It will be understood that in the arrangement of Fig. 1, the sway control apparatus is duplicated on the opposite sides of the vehicle except for the switch 14 and the air supply 8, which serve the apparatus on both sides of the vehicle.

Operation

When the body 1 is level, the switch 14 remains in the position illustrated in Fig. 1, with the mercury pool 18 in the center and neither set of contacts 16 and 17 closed. The inlet valves 9 are closed, the outlet shut-off valves 12 are open, and the pressure within the chambers 4 is that established by the pressure regulating valve 11.

The mercury pool 18 is a circuit closer for completing a circuit through the contacts 17 (or 16). This pool or circuit closer has a normal or first position, shown in the drawing, which it takes up when the body is level and not subject to lateral acceleration. The pool is movable from that first position through an intermediate range of positions to a second position where it engages the contacts 17 (or 16). (The intermediate range includes all positions along the elongated tube 15 between the first or center position and the second or end position.) The pool keeps the circuit open when it is in either the first or the intermediate range of positions, and closes the circuit only when it is in the second position. The elongated tube serves to require substantial time for movement of the circuit closer between its first and second positions, but allows the circuit to be opened immediately when the pool moves away from the second position.

Now assume that for some reason, for example because of travelling over a tilted surface, such as a highly crowned road, the switch 14 becomes tilted so that the mercury pool 18 moves over and electrically connects the contacts 17. This completes a circuit which may be traced from the positive terminal of battery 21 through wires 22 and 23, switch contacts 17 and thence to wire 24. The circuit there divides, one branch proceeding through switch fingers 20 and 19, wire 25 and electromagnet 10 and wire 26 to the opposite terminal of battery 21. The other branch proceeds from wire 24 to wire 27 and electromagnet 13 to the opposite terminal of battery 21. Inlet valve 9 is opened by energization of electromagnet 10 and shut-off valve 12 is closed by energization of electromagnet 13. Air under pressure is supplied to chamber 4, and it expands, lifting the right-hand side of the vehicle body. This motion continues either until the correction limiting control opens contacts 19 and 20 or until the body is tilted back far enough toward the horizontal so that the mercury pool 18 moves away from contacts 17, whereupon the circuits just traced are broken, and the electromagnets 10 and 13 are de-energized. The apparatus remains in this condition until some further motion of the switch 14 indicates that the body 1 has again departed from a level condition.

When the expansion of chamber 4 is terminated by the correction limiting control, the finger 20 separates from finger 19 opening the circuit to the electromagnet 10, so that the inlet valve 9 closes, preventing further expansion of the chamber 4, even though the body 1, remains somewhat tilted from the horizontal. The shut-off valve 12 remains closed, locking the air in the chamber 4 until the contacts 17 are again opened.

Note that the correction limiting control contacts 19 and 20 are both open when the body is parallel to the axle, that they close only after the body has departed slightly from that parallel position, and that they open again as the body approaches the parallel position.

As explained above, the contacts 17 of the mercury switch may be closed while the fingers 19, 20 are open. Consequently the contacts 17 and the fingers 19, 20 together constitute a sequence control means effective upon increasing tilt of the vehicle toward one side first to close the shut-off valve and upon further tilt in the same direction to open the inlet valve. Thereafter, as the tilt decreases, the inlet valve is first closed and the shut-off valve is opened.

It will readily be understood that a tilting movement of the body to the left results in a similar expansion of the chamber 4 at the left-hand side of the vehicle.

When the vehicle goes around a curve, for example a curve to the left, the centrifugal force, acting on the pool 18 tends to move it to the right along the tube 15. If the acceleration of the vehicle toward the left is sufficiently great, the mercury pool contacts the electrodes 17, again causing expansion of the chamber 4 on the right-hand side of the vehicle. Since the body of the vehicle tends to tilt to the right on a curve to the left, as a result of the centrifugal force, it may be seen that during such a time, two effects are acting cumulatively on the switch 14. One effect is due to the actual tilting of the body, and the other is due to the centrifugal force acting on the mercury itself. Air under pressure continues to be admitted to the chamber 4 until both of these effects are satisfied, i.e., until the vehicle body is actually tilted toward the left by an amount sufficient to compensate for the centrifugal force acting on the mercury pool, or until the correction limiting control operates. It therefore results that the body of the vehicle is braced against deviation from the horizontal, thereby greatly increasing the comfort of the passengers and/or the safety of the cargo.

An important feature of the present invention is the time delay which occurs between a movement of the vehicle body and a closure of the circuit through one of the sets of electrodes 16 and 17. This time delay is obtained in the structure illustrated by making the tube 15 of substantial length as compared to its internal cross-section so that a substantial time is required for the mercury pool 18 to move through the tube. Alternatively, the tube 15 may be made shorter and given a greater curvature, to the same effect. This time may be, for example, of the order of a major fraction of a second, but is nevertheless long enough so that rapid movements of the mercury due to rough roads and the like are not effective to move the mercury far enough so that it completes an operating circuit for the sway control apparatus.

While the mercury switch illustrated in Fig. 1 is presently preferred as being a desirable form of control device including a suitable time delay, other types of control devices may be used without departure from the invention.

FIG. 2

The arrangement shown in Fig. 2 is similar to that of Fig. 1, except that two mercury switches 28 and 29 are used at the opposite sides of the vehicle, in place of the one mercury switch 14 of Fig. 1. The switches 29 are of somewhat different contour, being curved so as to tilt upwardly at one end, at which end the circuit making electrodes are located.

The body 1 has been shown in Fig. 2 tilted to the right far enough so that the pool of mercury in switch 29 has closed its contacts, and the switch fingers 19 and 20 on the right-hand side of the vehicle have closed.

Those elements of Fig. 2 which correspond to their counterparts in Fig. 1 have been given the same reference numerals and will not be further described.

While I have shown and described certain preferred embodiments of my invention, other modifications thereof will readily occur to those skilled in the art, and I therefore intend my invention to be limited only by the appended claims.

I claim:

1. Apparatus for limiting the duration of swaying and tilting movement of a vehicle having a transverse axle and a body comprising, on at least one side of the vehicle, a motor means having an expansible chamber for applying a force tending to move the body vertically with respect to the axle, means for controlling said motor means including means for supplying an expansible fluid to said chamber including an inlet valve, a pressure regulating outlet valve, a shut-off outlet valve located downstream from said pressure regulating valve, said shut-off valve being normally opened and said inlet valve being normally closed, inertia operated means responsive to tilting of the vehicle body and to lateral acceleration thereof for actuating said motor control means and effective to open said inlet valve and to close said outlet valve causing said expansion of said chamber, said inertia operated means and said motor control means cooperating when said body tilts laterally from the horizontal in one sense to apply said force in a sense to restore said body to an even keel, and time delay means to delay operation of the motor means by the motor control means until the tilt or acceleration has persisted for a predetermined time.

2. Sway limiting apparatus as defined in claim 1 including electromagnetic means for operating said valves and means including an electrical switch controlled by said inertia operated means for energizing said electromagnetic valve operating means.

3. Apparatus for limiting the duration of swaying and tilting movements of a vehicle having a transverse axle and a body comprising, on at least one side of the vehicle, motor means for applying a force tending to move the body vertically with respect to the axle, means for controlling said motor means, inertia operated means responsive to tilting of the vehicle body and to lateral acceleration thereof for actuating said motor control means, said inertia operated means and said motor control means cooperating when said body tilts laterally from the horizontal in one sense to apply said force in a sense to restore said body to an even keel, time delay means to delay operation of the motor means by the motor control means until the tilt or acceleration has persisted for a predetermined time, and correction limiting means in said motor control means and effective to stabilize the force of said motor means as the body approaches a position spaced a predetermined normal distance from the axle even though the body may still be tilted from the horizontal.

4. Sway control apparatus for a vehicle having a transverse axle and a body, comprising, on at least one side of the vehicle, motor means for applying a force tending to move the body generally vertically with respect to the axle, said motor means comprising an expansible chamber, means for supplying an expansible fluid to said chamber including an inlet valve, a pressure regulating outlet valve, a shut-off outlet valve located downstream from said pressure regulating valve, said shut-off valve being normally open and said inlet valve being normally closed, and inertia operated sequence control means operatively connected to said shut-off valve and said inlet valve and effective upon increasing tilt of the vehicle toward said one side first to close said shut-off valve and upon further tilt in the same direction to open said inlet valve, and thereafter upon decreasing tilt in said one direction first to close said inlet valve and upon further decrease to open said shut-off valve.

5. Apparatus for limiting the duration of swaying and tilting movement of a vehicle having a transverse axle and a body comprising, on at least one side of the vehicle, a motor means having an expansible chamber for applying a force tending to move the body vertically with respect to the axle, means for controlling said motor means including means for supplying an expansible fluid to said chamber including an inlet valve, an outlet valve, said outlet valve being normally opened and said inlet valve being normally closed, inertia operated means responsive to tilting of the vehicle body and to lateral acceleration thereof for actuating said motor control means and effective to open said inlet valve and to close said outlet valve causing said expansion of said chamber, said inertia operated means and said motor control means cooperating when said body tilts laterally from the horizontal in one sense to apply said force in a sense to restore said body to an even keel, and time delay means to delay operation of the motor means by the motor control means until the tilt or acceleration has persisted for a predetermined time.

6. Sway limiting apparatus as defined in claim 5, including means effective when said outlet valve is open to regulate the pressure in said chamber.

7. Sway control apparatus for a vehicle having a transverse axle and a body, comprising, on at least one side of the vehicle, motor means for applying a force tending to move the body generally vertically with respect to the axle, said motor means comprising an expansible chamber, means for supplying an expansible fluid to said chamber including an inlet valve, an outlet valve, said outlet valve being normally open and said inlet valve being normally closed, and inertia operated sequence control means operatively connected to said outlet valve and said inlet valve and effective upon increasing tilt of the vehicle toward said one side first to close said outlet valve and upon further tilt in the same direction to open said inlet valve, and thereafter upon decreasing tilt in said one direction first to close said inlet valve and upon further decrease to open said outlet valve.

8. Tilting control apparatus for a vehicle having at least two laterally spaced wheels and a body, comprising for each of said wheels, axle means on which the wheel is mounted, and means located between and operatively connected to said body and the axle means adjacent the wheel for applying a force tending to move the body upwardly with respect to the axle; means for controlling both the force applying means, inertia operated means located midway between said wheels for actuating said control means and movable from a normal position to an active position in response to acceleration thereof in the direction of a line extending between said wheels and to tilting of said body about an axis perpendicular to the vertical plane containing said line, a pair of correction inhibiting means, each located adjacent one of the wheels and operatively connected to the body and the axle, said correction inhibiting means having a normal controlling position and movable therefrom to an active controlling position when the body moves out of a predetermined normal range of spacing from the axle, and means effective only when both the inertia operated means and the correction inhibiting means are in their active positions in response to tilting or acceleration of said body in one sense to apply a correcting force in an opposite sense.

9. Tilting control apparatus for a vehicle having at least two spaced supporting wheels and a body, comprising for at least one of said wheels, an axle on which said one wheel is mounted, and means defining an expansible chamber having relatively movable walls respectively connected to the axle and the body, and effective upon expansion of the chamber to apply to said walls a correcting force tending to move the body upwardly with respect to the axle; a source of compressible fluid under pressure, means for controlling the pressure in said chamber including an inlet valve connected to said source and an outlet valve, inertia operated means for actuating said control means and movable from a normal position to an active position in response to acceleration or tilting of the vehicle body in a direction tending to move the body downwardly with respect to the axle, correction inhibiting means operatively connected to the body and the axle, said correction inhibiting means having a normal controlling position and movable therefrom to an active controlling position when the body moves out of a predetermined normal range of spacing from the axle, means effective when the inertia operated means moves to its active position to close said outlet valve, and means effective only when both the inertia operated means and the correction inhibiting means are in their active positions to open said inlet valve.

References Cited in the file of this patent

UNITED STATES PATENTS

| | | |
|---|---|---|
| 2,115,159 | Dupuy | Apr. 26, 1938 |
| 2,124,124 | Schoepf | July 19, 1938 |
| 2,128,273 | Stevens | Aug. 30, 1938 |
| 2,353,503 | Rost | July 11, 1944 |
| 2,572,910 | Brown | Oct. 30, 1951 |
| 2,684,254 | Goss | July 20, 1954 |
| 2,850,290 | Borgmann | Sept. 2, 1958 |

FOREIGN PATENTS

| | | |
|---|---|---|
| 671,298 | France | Aug. 31, 1929 |
| 828,405 | France | Feb. 7, 1938 |